US011177472B2

United States Patent
Woo et al.

(10) Patent No.: US 11,177,472 B2
(45) Date of Patent: Nov. 16, 2021

(54) CATHODE OF ALL-SOLID LITHIUM BATTERY AND SECONDARY BATTERY USING THE SAME

(71) Applicants: Hyundai Motor Company, Seoul (KR); Kia Motors Corporation, Seoul (KR)

(72) Inventors: Hee Jin Woo, Gyeonggi-do (KR); Dae Gun Jin, Gyeonggi-do (KR); Hee Yeon Ryu, Gyeonggi-do (KR); Yoon Ji Lee, Gyeonggi-do (KR); Yong Gu Kim, Seoul (KR); Na Ry Shin, Seoul (KR); Eun Ji Kwon, Gyeonggi-do (KR); Sang Jin Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 130 days.

(21) Appl. No.: 16/402,918

(22) Filed: May 3, 2019

(65) Prior Publication Data
US 2019/0260021 A1   Aug. 22, 2019

Related U.S. Application Data

(62) Division of application No. 14/935,925, filed on Nov. 9, 2015, now Pat. No. 10,326,128.

(30) Foreign Application Priority Data

Dec. 31, 2014  (KR) .......................... 10-2014-0195115

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0404* (2013.01); *H01M 4/0409* (2013.01);
(Continued)

(58) Field of Classification Search
CPC ..................................................... H01M 4/366
See application file for complete search history.

(56) References Cited

U.S. PATENT DOCUMENTS

2001/0014422 A1* 8/2001 Omaru ................ H01M 50/581
429/231.1
2011/0195315 A1   8/2011 Tsuchida et al.
(Continued)

FOREIGN PATENT DOCUMENTS

CN   102576902 A   7/2012
JP   2009-094029 A   4/2009
(Continued)

OTHER PUBLICATIONS

Translation of JP2009094029 (Year: 2021).*

*Primary Examiner* — Brian R Ohara
(74) *Attorney, Agent, or Firm* — Mintz Levin Cohn Ferris Glovsky and Popeo, P.C.; Peter F. Corless (57) ABSTRACT

Disclose are a cathode of an all-solid lithium battery, and a secondary battery system using the same. The cathode includes a lithium composite, and a method of manufacturing the lithium composite comprises: dispersing a solid electrolyte to be uniformly distributed in the pores of a mesoporous conductor to provide a solid electrolyte composite, and coating the solid electrolyte composite on the surface of a lithium compound including nonmetallic solids such as S, Se, and Te.

12 Claims, 4 Drawing Sheets

(51) Int. Cl.

| | |
|---|---|
| *H01M 4/136* | (2010.01) |
| *H01M 4/1397* | (2010.01) |
| *H01M 4/62* | (2006.01) |
| *H01M 4/80* | (2006.01) |
| *H01M 10/052* | (2010.01) |
| *H01M 10/0562* | (2010.01) |
| *H01M 4/58* | (2010.01) |
| *H01M 4/66* | (2006.01) |

(52) U.S. Cl.
CPC ....... *H01M 4/0416* (2013.01); *H01M 4/0435* (2013.01); *H01M 4/0485* (2013.01); *H01M 4/136* (2013.01); *H01M 4/1397* (2013.01); *H01M 4/62* (2013.01); *H01M 4/622* (2013.01); *H01M 4/623* (2013.01); *H01M 4/80* (2013.01); *H01M 10/052* (2013.01); *H01M 10/0562* (2013.01); *H01M 4/5815* (2013.01); *H01M 4/661* (2013.01); *H01M 4/663* (2013.01); *H01M 4/665* (2013.01); *H01M 2300/0065* (2013.01); *Y02T 10/70* (2013.01)

(56) References Cited

U.S. PATENT DOCUMENTS

| | | | |
|---|---|---|---|
| 2012/0231346 A1* | 9/2012 | Tsujii | H01M 10/0565 429/306 |
| 2013/0059209 A1 | 3/2013 | Ota et al. | |
| 2013/0164620 A1 | 6/2013 | Woo et al. | |

FOREIGN PATENT DOCUMENTS

| | | | |
|---|---|---|---|
| JP | 2009094029 A | * | 4/2009 |
| JP | 2010-027458 A | | 2/2010 |
| JP | 2010-138039 A | | 6/2010 |
| JP | 4615339 B2 | | 1/2011 |
| JP | 2013-051171 A | | 3/2013 |
| JP | 2013-143298 A | | 7/2013 |
| JP | 2013-143299 A | | 7/2013 |
| JP | 2013-254620 A | | 12/2013 |
| KR | 2013-0073766 A | | 7/2013 |
| KR | 2013-0123142 A | | 11/2013 |
| KR | 10-2014-0075526 A | | 6/2014 |
| KR | 10-2014-0096072 A | | 8/2014 |
| WO | 2014/112401 A1 | | 7/2014 |

* cited by examiner

CATHODE OF ALL-SOLID LITHIUM BATTERY AND SECONDARY BATTERY USING THE SAME

CROSS-REFERENCE TO RELATED APPLICATION

This application is a Divisional Application of U.S. patent application Ser. No. 14/935,925 filed on Nov. 9, 2015 which claims under 35 U.S.C. § 119(a) the benefit of Korean Patent Application No. 10-2014-0195115 filed on Dec. 31, 2014, the entire content of which are incorporated herein by reference.

TECHNICAL FIELD

The present invention relates to a cathode of an all-solid lithium battery, and a secondary battery system using the same. The cathode may include a lithium composite that is formed of a mesoporous conductor, a solid electrolyte and a lithium compound, e.g. a $Li_2X$ particle. The lithium composite of the cathode can be manufactured by dispersing a solid electrolyte in the pores of the mesoporous conductor to provide a solid electrolyte composite, and coating the solid electrolyte composite on the surface of the lithium compound ($Li_2X$) including nonmetallic solids such as S, Se, and Te.

BACKGROUND

A secondary battery has been used as high-performance energy source for an electric car, a bulk power storage battery, such as, a battery energy storage system, and small portable electric devices, such as, a cellular phone, a camcorder, and a laptop computer. Thus, a research for reducing weight of a part and electric consumption and improving a secondary battery with reduced size and greater capacity component has been conducted in order to implement the miniaturization and the continuous use of a portable electric device.

For example, a lithium ion battery as a secondary battery can provide greater energy density and greater capacitance per unit area than a nickel-manganese battery or a nickel-cadmium battery. In addition, the lithium ion battery can have reduced self-discharge rate and an extended life. Furthermore, the lithium ion battery does not have a memory effect, and thus, may provide convenience of use and extended life span.

However, as being used as a battery for a new generation electric car, the lithium ion battery may have various problems, such as, a stability problem due to overheating, low energy density, and low power. In order to overcome these problems of the lithium ion battery, the research and development on a post lithium ion battery like a lithium air secondary battery have been actively progressed.

For instance, a lithium sulfur secondary battery can be provided with high energy density, e.g. of about 2500 Wh-kg, which is about 5 times greater than the theoretical energy density of a conventional lithium ion battery. Therefore, the lithium sulfur secondary battery is considered to be a suitable battery for an electric car that requires high capacity and high energy density. However, a polysulfide shuttle phenomenon may occur when a liquid electrolyte is used, thereby causing a self-discharge effect and deteriorating the life span of a lithium sulfur secondary battery.

Moreover, safety issue may arise sine the liquid electrolyte is substantially instable at high-temperature during charging and discharging.

In the related arts, Korean Publication Application No. 2013-0123142 discloses a lithium electrode as materials for a secondary battery using lithium, (a lithium metal battery). The lithium electrode comprises a solid super-ionic conductor manufactured with a three-dimensional multi-porous structure; a lithium metal or lithium alloy filled in each of the open pores that constitute the multi-pores; and a collector bound to one side of the solid super-ionic conductor, in which a lithium metal or lithium alloy is filled in each of the pores.

In addition, JP 10-4615339 A has reported a porous solid electrode and an all-solid lithium secondary battery using the same, and has disclosed the electrode for a lithium secondary battery, in which for the electrode for the lithium secondary battery, the electrode is composed of the complex of a porous solid electrolyte exhibiting the lithium-ionic conductivity of $0.5 \times 10^{-4}$ $S\text{-}cm^{-1}$ or more and a battery active material that is filled in the pores of the porous solid electrolyte.

Further, Korean Publication Application No. 2013-0073766 has disclosed a cathode for a lithium sulfur secondary battery including a sulfur multi-porous nanocomplex structure and a porous nano conductor, in which i) the sulfur multi-porous nanocomplex structure having the sulfur particles being filled in the pores of a porous conductor having pores and ii) the porous conductor of the same kind without the sulfur particles being filled in the pores are adjacent each other and arranged in a volume ratio of 1:0.1 to 0.9.

JP 2009-094029 A has also disclosed an all-solid lithium secondary battery and an electrode for an all-solid lithium secondary battery, in which for at least one electrode the proportions of a polymer solid electrolyte and inorganic solid electrolyte powder to an electrode mixture including an active material, a conductive composite, a polymer solid electrolyte and an inorganic solid electrolyte powder are less than 50% in a volume fraction.

Moreover, JP 2013-051171 A has disclosed to an electrode body for an all-solid battery and an all-solid battery, in which the electrode body for an all-solid battery includes an electrode layer including an active material particle, a lithium-ionic conductive glass solid electrolyte, and an oxide-based conductor and a solid electrolyte layer including lithium-ionic conductive glass solid electrolyte.

However, even with the above-described known techniques, long-term stability, an inhibition in polysulfide shuttle phenomenon, or high efficiency charge/discharge effect, which is required for an automotive battery system, have not been obtained. In order to solve the above mentioned technical difficulties, the present invention provides a lithium composite as being used as a cathode material, and thus, may provide superior stability and greater efficiency all-solid lithium battery system than the conventional secondary lithium batteries.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, the present invention provides a cathode of an all-solid lithium battery and an all-solid battery system using the same. The cathode may include a lithium composite which is formed from a solid electrolyte, a mesoporous conductor and a lithium compound which is an active cathode material. As such, the lithium composite may be used for securing an ion-electron migration passage that may occur in the all-solid battery. Further, when a volume of the active material is expanded during charging and discharging of the battery, a stable structure may be maintained by using the lithium compound as the active material thereby preventing the structural destruction. In particular, the lithium compound as the active cathode material may be represented by $Li_2X$, when X is nonmetallic solid material, such as S, Se, or Te.

In one aspect, provided is a method for manufacturing a cathode of an all-solid lithium battery. The method comprises:

dispersing a solid electrolyte in pores of a mesoporous conductor to provide a solid electrolyte composite;

preparing a lithium composite by coating the solid electrolyte composite on a surface of a lithium compound particle; and connecting a plurality of the lithium composites using a binder.

The term "mesoporous", as used herein, may describe a state containing pores, and the diameters of the pores may suitably range from about 0.1 to about 1000 nm, from about 1 to about 100 nm, or particularly from about 2 to about 50 nm. In addition, the "mesoporous" material or "mesoporous" conductor may include such pores having regular or irregular shapes, without limitation to size, arrangement or order.

As used herein, the term "solid electrolyte", refers to a solid phase material (e.g. crystalline, polymer, ionic compound, organic compound and the like) that can provide electric conductivity or ionic conductivity. In the solid electrolyte, electrons or ions can move or be transferred without a need of fluid or a liquid, as compared to "non-solid electrolyte" material. Particularly, the "solid electrolyte composite" in the present invention may comprise at least two non-identical materials, for example, a composite formed by the solid electrolyte and the mesoporous conductor. The solid electrolyte composite may contain the solid electrolyte and the mesoporous conductor without losing their physical or chemical properties. Preferably, such constituents may be suitably mixed or distributed at a predetermined ratio so as to obtain suitable properties of the composite. For example, the solid electrolyte composite may contain the solid electrolyte and the mesoporous conductor at a weight ratio of about 0.01:0.99, of about 0.05:0.95, or of about 0.1:0.9.

As used herein, the term "particle" may be formed by aggregating of component molecules without limitations in shapes or sizes. The particles in the present invention may include homogeneous constituents or heterogeneous constituents at least in a portion thereof, however, properties of the particles may depend on the composition, shape, size and the like. Further, each particle may also possess independent and particular properties, e.g. dispersibility or ionic strength, in certain condition or environment (e.g. in a solvent or solution, pores).

As used herein, the term "lithium composite" refers to a composite formed by mixing or complexing the solid electrolyte composite as described above and the lithium compound, in other words, the lithium composite may include the solid electrolyte, the mesoporous conductor and the lithium compound. Particularly, the lithium composite may be formed as a particle that includes inner portion of the lithium compound and outer portion of the solid electrolyte composite that is attached or coated on the surface of the lithium compound. The lithium composite may contain the lithium compound as an active cathode material, and each constituent thereof may not lose their physical or chemical properties as being the composite particle. Preferably, such constituents may be suitably mixed or distributed at a predetermined ratio so as to obtain suitable properties of the lithium composite for the cathode of all-solid lithium battery. For example, the lithium composite may contain the solid electrolyte composite and the lithium compound at a weight ratio of about 0.01:0.99, of about 0.05:0.95 or of about 0.1:0.9.

In particular, the lithium compound as included in the lithium composite may be represented by $Li_2X$, and X may comprise at least one selected from the group consisting of S, Se, and Te.

Preferably, when the solid electrolyte composite is formed, the solid electrolyte may be uniformly dispersed in the pores of the mesoporous conductor.

The term "uniformly" as used herein describes that that composition or a concentration of component or constituent is substantially maintained based on unit area of a mixture. In particular, the uniformly dispersed or distributed may be substantially homogeneous composition of at least two components, for example, the solid electrolyte distributed in the pores per unit area.

Further in particular, in the solid electrolyte composite, the solid electrolyte may be uniformly distributed in the pores of the mesoporous conductor.

The method may further comprise: coating a slurry of the lithium composite connected by the binder on a cathode collector; and rolling the coated slurry.

Preferably, the mesoporous conductor may include a metallic element and a carbon material such that the mesoporous conductor may have an electric resistance value of about $10^{-6}$ Ω·m or less. Further, the size of the mesoporous conductor may be from about 10 nm to about 100 μm, the porosity of the mesoporous conductor may be from about 10 to about 90 vol %, and the size of the pores of the mesoporous conductor may be from about 2 nm to about 50 nm.

Preferably, the solid electrolyte may be a material in a two-phase or more including a Li element, and the solid electrolyte may comprise one or more selected from the group consisting of oxide-based solid electrolyte including lithium oxide and sulfur-based solid electrolyte including lithium sulfur.

Preferably, the solid electrolyte may be dispersed in the pores of the mesoporous conductor by a melting-diffusion method, a infiltration method, or a gas-solid mixing method. Alternatively, the solid electrolyte may be uniformly distributed in the pores of the mesoporous conductor, by dispersing the solid electrolyte in a solvent, mixing a solid electrolyte solution with the mesoporous conductor, and evaporating the solvent.

Preferably, the coating may be performed by a dry ball milling, a dry planetary milling, mechanofusion, a wet ball milling, or a wet planetary milling.

Preferably, the binder may comprise one or more selected from the group consisting of a fluorine-based binder and a rubber-based binder.

When the slurry of the lithium electrolyte is coated on the cathode, such method may be a slip casting, pressure casting, tape casting, or gel casting method.

Further, the coated slurry may be treated with rolling, for example, by a compaction, a roll press, or an isostatic compaction, and the rolling may be performed under the condition of a compression ratio of about 20 to 50%.

In another aspect, provided is a cathode of an all-solid lithium battery that may comprise: a cathode collector; and a lithium composite.

In particular, the lithium composite may be formed by coating a $Li_2X$ particle with a solid electrolyte composite that comprises a solid electrolyte dispersed in pores of a mesoporous conductor. Further, in particular, the $Li_2X$ particle is an active material of the cathode, and X in the $Li_2X$ particle may be at least one selected from the group consisting of S, Se, or Te.

Preferably, the mesoporous conductor may include a metallic element and a carbon material such that the mesoporous conductor may have an electric resistance value of about $10^{-6}$ Ω·m or less. Further, the size of the mesoporous conductor may be from about 10 nm to about 100 μm, the porosity of the mesoporous conductor may be from about 10 to about 90 vol %, and the size of the pores of the mesoporous conductor may be from about 2 nm to about 50 nm.

Preferably, the solid electrolyte may be a material in a two-phase or more including a Li element, and the solid electrolyte may be one or more selected from the group consisting of oxide-based solid electrolyte including lithium oxide and sulfur-based solid electrolyte including lithium sulfur.

In the cathode, a plurality of the $Li_2X$ particles may be connected by a binder so as to form the cathode, and the binder comprises one or more selected from the group consisting of a fluorine-based binder and a rubber-based binder.

Further provided is a lithium sulfur secondary battery cell that comprises the cathode as described above. Preferably, the lithium sulfur secondary battery cell may further comprise a solid electrolyte laminated on the surface of the cathode, an anode laminated on the solid electrolyte, and an anode collector.

Other aspects of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
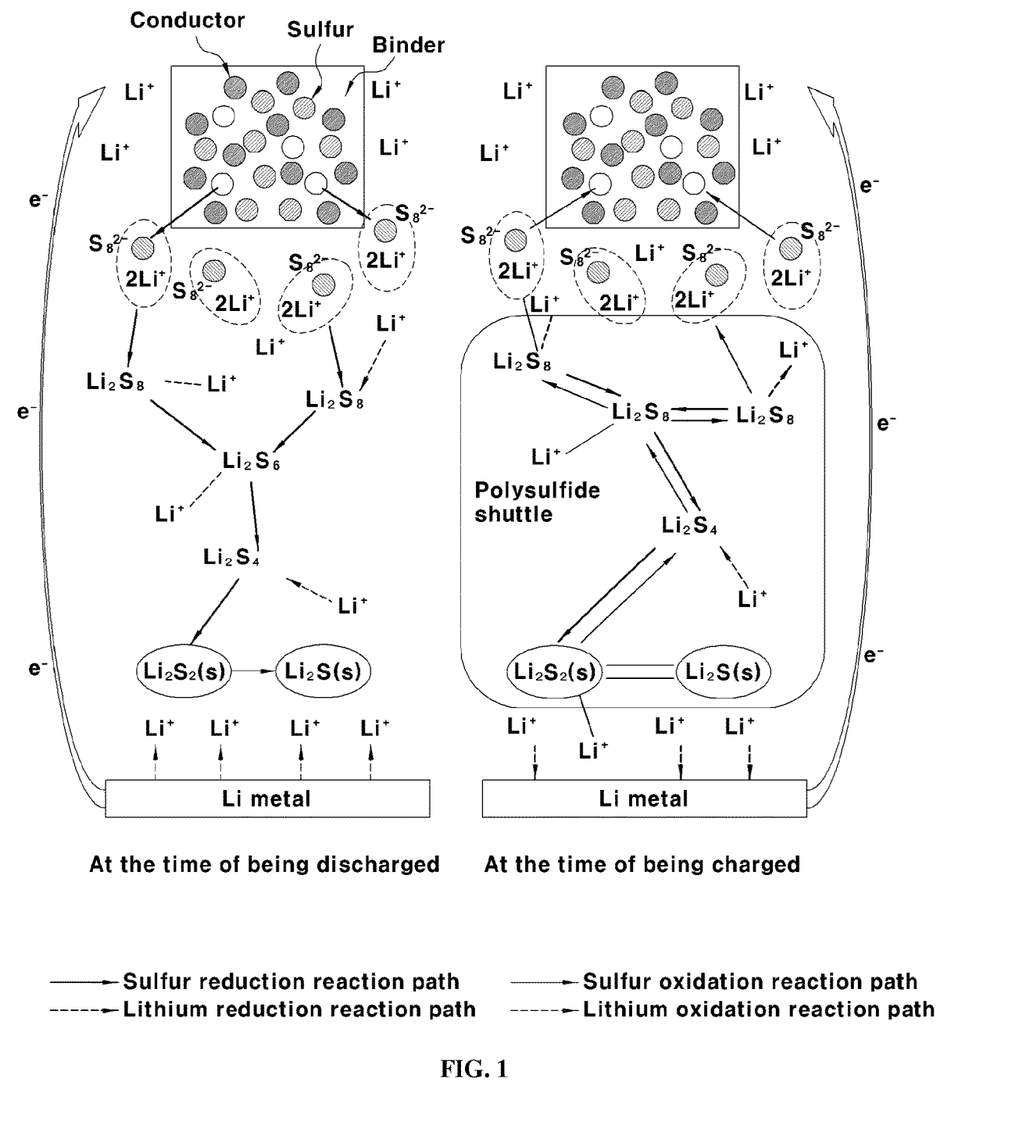
FIG. 1 illustrates a chemical mechanism in a conventional all-solid lithium battery.

FIG. 1 illustrates a conventional technique of a lithium sulfur battery. During discharging, the electron migrated from a lithium anode is bound to a sulfur particle adjacent to the surface of a conductor, and then, the sulfur particle is reduced into $S_8^{2-}$ and dissolved in liquid electrolyte. The $S_8^{2-}$ is bound to a lithium ion to form $Li_2S_8$ (long-chain polysulfide) as being dissolved in electrolyte. The $Li_2S_8$ is consistently subjected to a reduction reaction with a Li ion, and finally, is precipitated on the surface of the lithium anode in a type of $Li_2S_2$—$Li_2S$ (short-chain polysulfide). Meanwhile, during charging, due to an oxidation reaction, the precipitated polysulfide turns into $S_8^{2-}$ through a reverse process, and the electron is lost, such that the sulfur particle is precipitated on the surface of the conductor. However, as illustrated in drawings, at the time of being charged, during the oxidation process from $Li_2S_2$—$Li_2S$ into $Li_2S_8$, a polysulfide shuttle phenomenon may occur as reacting with a lithium ion and producing $Li_2S_2$—$Li_2S$ again. Such a shuttle phenomenon may occur in a lithium sulfur battery that uses a liquid electrolyte, and further may cause self-discharge continuously during the charging, which may be one of the greatest problem occurring in a liquid electrolyte system. Therefore, a battery life may be reduced, and the efficiency of active material mass at the time of being discharged may be reduced. In order to solve the conventional problems, according to the present technique, a solid electrolyte complex may be formed to solve the above problems.

Thus, in one aspect, the present invention provides a method for manufacturing a cathode of an all-solid lithium battery. The method may comprise:

dispersing a solid electrolyte in pores of a mesoporous conductor to provide a solid electrolyte composite;

preparing a lithium composite by coating the solid electrolyte composite on a surface of a lithium compound particle; and connecting a plurality of the lithium composites using a binder.

Alternatively, the method may comprise:

providing a solid electrolyte;

preparing a solid electrolyte composite by dispersing the solid electrolyte in the pores of a mesoporous conductor;

preparing a lithium composite by coating the solid electrolyte composite on a surface of a lithium compound particle; and connecting a plurality of the lithium composites using a binder.

Preferably, in the solid electrolyte composite, the solid electrolyte may be uniformly dispersed in the pores of the mesoporous conductor.

In a preferred embodiment, the lithium compound particle as the active material of the cathode may be represented by $Li_2X$ and X may be at least one selected from the group consisting of S, Se, and Te. Particularly, the $Li_2X$ particles may be formed by aggregating or binding each $Li_2X$ molecules, in a shape of sphere, oval or other polyhedrons, however, without any limitations in shapes.

Preferably, the $Li_2X$ particle may suitably have a size ranging from about 10 nm to about 100 μm, from about 100 nm to about 5 μm.

Figure 2:
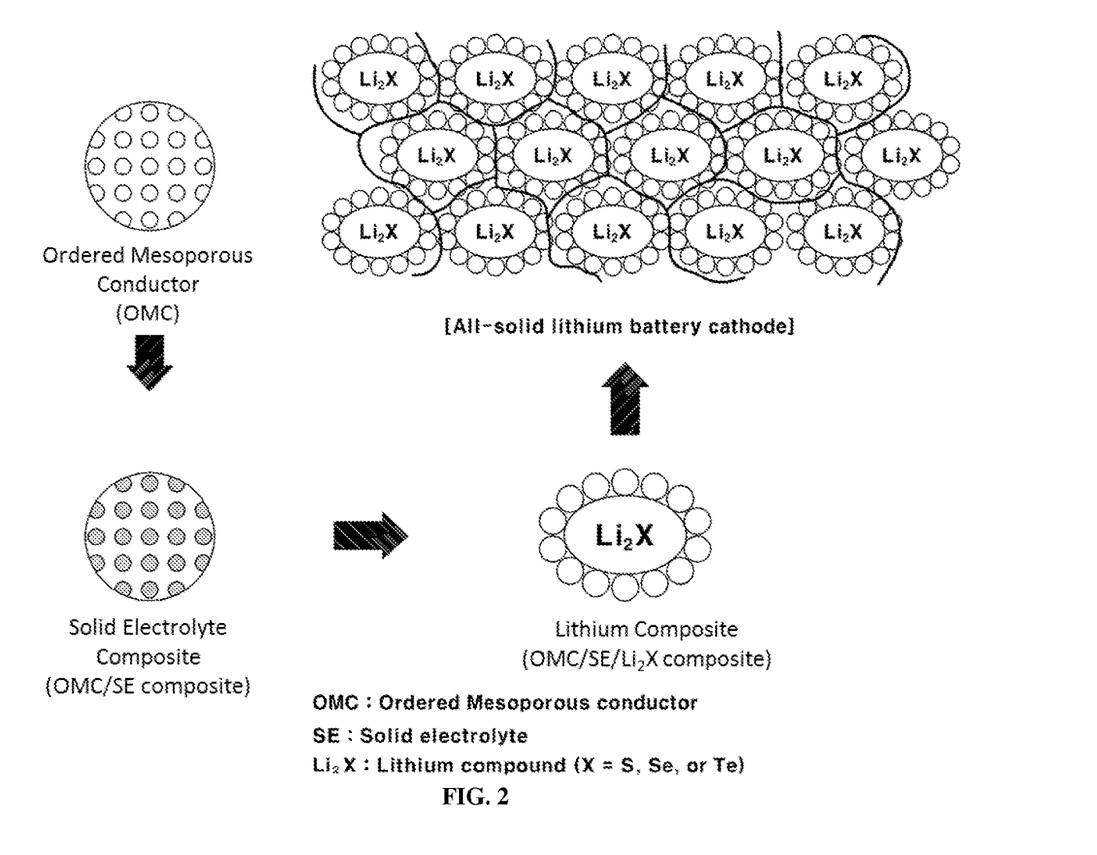
FIG. 2 illustrates an exemplary cathode and active materials thereof in an exemplary all-solid lithium battery according to an exemplary embodiment of the present invention.

FIG. 2 illustrates an exemplary cathode structure of the all-solid lithium battery according to an exemplary embodiment of the present invention, and an exemplary method for manufacturing the same.

First, a mesoporous conductor (ordered mesoporous conductor, OMC) and the solid electrolyte may be provided and a solid electrolyte composite may be prepared by dispersing the synthesized solid electrolyte (SE) in the pores of a mesoporous conductor. In particular, the solid electrolyte may be uniformly distributed throughout the pores of the mesoporous conductor.

Subsequently, the solid electrolyte composite may be coated on the surface of a lithium compound or a lithium compound particle to form a lithium composite. Preferably, the lithium compound may be represented as $Li_2X$. The lithium particles of $Li_2X$ may include at least one element of nonmetallic solid, such as S, Se, and Te. In particular, the nonmetallic solid material may be selected from Group 6 elements in the periodic table.

Further, in order to prepare an electrode, the prepared lithium composites may be connected each other using a binder such as an organic binder, and then, may be treated with a rolling to provide sufficient ion conduction and electron transport.

Figure 3:
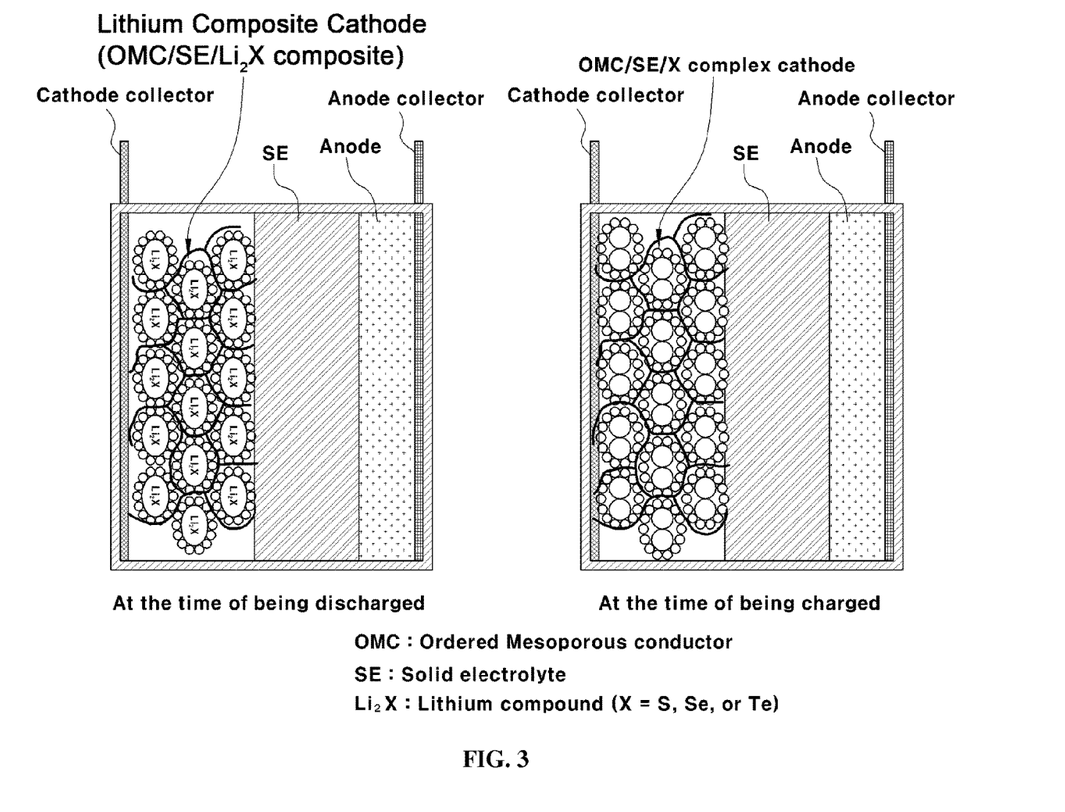
FIG. 3 illustrates an exemplary battery system using an exemplary cathode according to an exemplary embodiment of the present invention.

FIG. 3 illustrates an exemplary manufacturing method and an exemplary cathode structure of an exemplary all-solid lithium battery according to an exemplary embodiment of the present invention.

For example, a slurry comprising the lithium composite may be coated on the surface of a cathode collector, and then, the coated slurry may be treated with rolling. A solid electrolyte of the battery may be laminated on the cathode surface in a form of a thin film, and then, as a counter electrode, an anode comprising lithium and silicone may be connected on the surface of an anode collector to manufacture a type of mono cell.

An operation principle of the battery system is as follows. At the time of being discharged, $Li_2X$ (X: S, Se, Te), a cathode active material, loses electron, and then, an oxidation reaction may occur as follows:

$$Li_2X(s) \rightarrow 2Li^+ + X(s) + 2e$$

As such, a lithium ion can move to the side of an anode and X may be formed in a solid phase on the surface of a cathode. At the time of being charged, the lithium is oxidized on the surface of an anode, and then, moved to the side of a cathode; and in the cathode, the reduction reaction may occur to form $Li_2X$ as follows.

$$X(s) + 2Li^+ + 2e^- \rightarrow Li_2X(s),$$

As discussed above, the $Li_2X$ of the present invention is used as an active material of a cathode.

Preferably, the mesoporous conductor may have an electric resistance value of about $10^{-6}$ Ω·m or less, and may include a metallic element and carbon. Preferably, the size of the mesoporous conductor may range from several nm to 100 μm, and the porosity thereof may be from about 10 to about 90 vol %. In addition, a size of pores may range from about 2 nm to about 50 nm or less such that is the pores may be affected by capillary force when dispersing the solid electrolyte in the pores.

The solid electrolyte may be one or more selected from the group consisting of oxide-based solid electrolyte and sulfur-based solid electrolyte. Exemplary oxide-based solid electrolyte may be, not limited to, a lithium oxide that may exist in a two-phase or more, and exemplary sulfur-based solid electrolyte may be, but not limited to lithium sulfur.

In a preferred aspect, when the solid electrolyte is dispersed in the mesoporous conductor, the dispersing may be performed by a melting-diffusion method, an infiltration method, or a gas-solid mixing method. For example, the melting-diffusion method may include: changing the solid electrolyte to a liquid phase having fluidity by applying heat to the solid electrolyte, and then, injecting the solid electrolyte inside the mesopores of the conductor. The gas-solid mixing method may include: including evaporating the solid electrolyte, and then, depositing the solid electrolyte in a solid phase inside the mesopores of the conductor.

Further, the solid electrolyte composite may be coated by a mechanical drying and/or wet mixing. Exemplary mechanical dry mixing may be a ball milling, a planetary milling, or a mechanofusion, and exemplary mechanical wet mixing may be a ball milling or planetary milling using a solvent that does not generate the side reactions between the conductor and solid electrolyte.

Preferably, the thus prepared lithium composite may suitably have a size ranging from about 100 nm to about 100 μm, or from about 1 μm to about 10 μm.

The binder may comprise one or more selected from the group consisting of a fluorine-based binder and a rubber-based binder.

Meanwhile, when the slurry comprising the lithium composite is coated on a cathode collector, a rolling may be performed, and then, the coating may be performed by a slip casting, pressure casting, tape casting, or gel casting method. Preferably, the rolling may be performed under the condition of the compression ratio of about 20 to 50% by a compaction, roll press, isostatic compaction, and the like.

The present invention has remarkable advantages as compared with the conventional techniques as follows.

1) The life span of the battery may be improved is excellent because the shuttle phenomenon of an active material may be prevented as compared with the conventional liquid electrolyte system.

2) The stability of the battery may be improved at a high temperature as compared with the case of using liquid electrolyte.

3) Since liquid electrolyte is not used, a secondary battery having high energy density may be obtained as compared with the conventional technique.

4) By using an active material in a type of $Li_2X$ as a cathode active material, sufficient space may be maintained even when the volume of X is expanded during a reduction reaction.

Examples

Hereinafter, the present invention will be described in more detail with reference to the following embodiments. However, the embodiments are only for illustrating the present invention, and the present invention is not limited thereto.

Example

1. Manufacturing of OMC/SE Complex $Li_2S$ powder and $P_2S_5$ were mixed in a ratio of 80:20 wt %; the mixture thus obtained was milled at 500 rpm for 8 hours; and then, the mixture thus obtained was subjected to a thermal treatment at 200° C. The prepared $Li_2S/P_2S_5$ (LSPS) powder was added in an N-methylformamide (NMF) solvent; the LSPS powder was dissolved to be a state of super-saturation; the ordered mesoporous conductor (OMC) powder was dispersed into a LSPS solution; the OMC powder was subjected to a vacuum thermal treatment at 150° C. for 3 hours; and then, the solvent was removed to manufacture an OMC/SE complex.

2. Manufacturing of OMC/SE/$Li_2S$ Complex

The OMC/SE complex and $Li_2S$ powder were mixed in a mass ratio of 6:4; and then, the mixture thus obtained was subjected to a planetary milling at 300 rpm for 3 hours to manufacture a OMC/SE/$Li_2S$ complex.

3. Manufacturing of all-solid complex cathode

The above-prepared OMC/SE/$Li_2S$ powder, a rubber-based binder, and a BTX (benzene, toluene, and the three xylene isomers)-based solvent were mixed to prepare cathode slurry. The cathode slurry was coated on the surface of a substrate; and then, the solvent was removed through a convective drying at 80° C. for 8 hours to manufacture an all-solid complex cathode.

Figure 4:
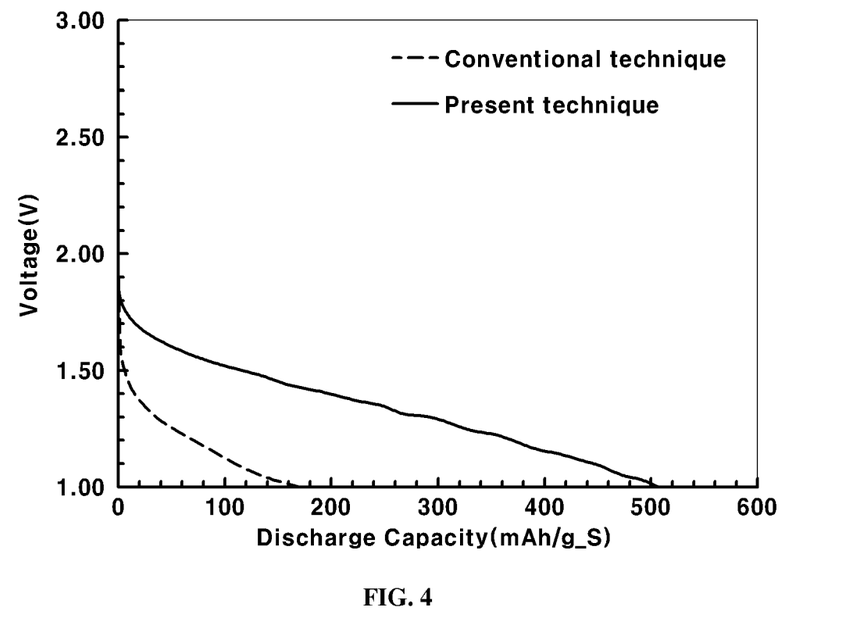
FIG. 4 shows exemplary experimental results of measuring the discharge capacities and voltages of an exemplar battery including an exemplary all-solid complex cathode according to an exemplary embodiment of the present invention and a conventional battery including a conventional cathode in the related arts.

For the all-solid complex cathode thus obtained and the conventional cathode, the discharge capacities and voltages were measured. The results thus obtained are illustrated in FIG. 4.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a cathode of an all-solid lithium battery, comprising:
dispersing a solid electrolyte in pores of a mesoporous conductor to provide a solid electrolyte composite;
preparing a lithium composite by coating the solid electrolyte composite on a surface of a lithium compound particle; and
connecting a plurality of the lithium composites using a binder,
wherein the lithium compound is an active material of the cathode, and
the mesoporous conductor comprises a metallic element and a carbon material such that the mesoporous conductor has an electric resistance value of about $10^{-6}$ $\Omega \cdot m$ or less.

2. The method of claim 1, wherein the lithium compound is represented as $Li_2X$, wherein the X comprises at least one selected from the group consisting of S, Se, and Te.

3. The method of claim 1, wherein the solid electrolyte is uniformly distributed in the pores of the mesoporous conductor.

4. The method of claim 1, the method further comprising, coating a slurry of the lithium composite connected by the binder on a cathode collector, and then, rolling the coated slurry.

5. The method of claim 1, wherein a size of the mesoporous conductor is from about 10 nm to about 100 μm, a porosity of the mesoporous conductor is from about 10 to about 90 vol %, and a size of the pores of the mesoporous conductor is from about 2 nm to about 50 nm.

6. The method of claim 1, wherein the solid electrolyte is a material in a two-phase or more including a Li element, and the solid electrolyte comprises one or more selected from the group consisting of oxide-based solid electrolyte including lithium oxide and sulfur-based solid electrolyte including lithium sulfur.

7. The method of claim 1, wherein the solid electrolyte is dispersed in the pores of the mesoporous conductor by a melting-diffusion method, a infiltration method, or a gas-solid mixing method.

8. The method of claim 1, wherein the solid electrolyte is uniformly distributed in the pores of the mesoporous conductor, by preparing a solid electrolyte solution by dispersing the solid electrolyte in a solvent, mixing the solid electrolyte solution with the mesoporous conductor, and evaporating the solvent.

9. The method of claim 1, wherein the coating of the solid electrolyte composite is performed by a dry ball milling, a dry planetary milling, mechanofusion, a wet ball milling, or a wet planetary milling.

10. The method of claim 1, wherein the binder comprises one or more selected from the group consisting of a fluorine-based binder and a rubber-based binder.

11. The method of claim 4, wherein the slurry is coated by a slip casting, pressure casting, tape casting, or gel casting method.

12. The method of claim 4, wherein the rolling is performed by a compaction, a roll press, or an isostatic compaction, and the rolling is performed under the condition of a compression ratio of about 20 to 50%.

* * * * *